United States Patent [19]

Klopfenstein et al.

[11] Patent Number: 5,132,631
[45] Date of Patent: Jul. 21, 1992

[54] GLASS SURFACE COATING DETECTOR

[75] Inventors: John R. Klopfenstein, Toledo, Ohio; Drew K. Notestine, Lambertville, Mich.

[73] Assignee: A. E., Inc., Toledo, Ohio

[21] Appl. No.: 496,669

[22] Filed: Mar. 21, 1990

[51] Int. Cl.[5] .......................... G01R 27/26
[52] U.S. Cl. ..................... 324/676; 324/679; 324/681; 324/663
[58] Field of Search ............ 324/671, 674, 681, 686, 324/662, 658, 663, 676, 678, 557, 558, 559, 551, 554, 679

[56] References Cited

U.S. PATENT DOCUMENTS

| | | | |
|---|---|---|---|
| 2,616,068 | 10/1952 | McDonald | 324/687 X |
| 3,779,378 | 12/1973 | Scherf | 324/671 X |
| 3,801,900 | 4/1974 | Szasz | 324/671 |
| 3,855,527 | 12/1974 | Masopust, Jr. | 324/678 X |
| 4,149,231 | 4/1979 | Bukosky et al. | 324/678 X |
| 4,307,337 | 12/1981 | van den Berg et al. | 324/662 |
| 4,714,877 | 12/1987 | Kong | 324/133 |

Primary Examiner—Jack B. Harvey
Attorney, Agent, or Firm—MacMillan, Sobanski & Todd

[57] ABSTRACT

Apparatus and method for detecting the presence and surface location of or the absence of an electrically conductive solar coating on a pane of glass. A capacitor is formed by placing a probe against one surface of the glass. The value of the capacitor is determined by the presence or absence of a conductive coating on the glass and by the location of any coating relative to the probe. Variations in the value of the capacitor are detected to selectively illuminate lights which indicate either the absence of a surface coating, the presence of a surface coating on a near surface or pane of the glass or the presence of a surface coating on a far surface or pane of the glass.

8 Claims, 1 Drawing Sheet

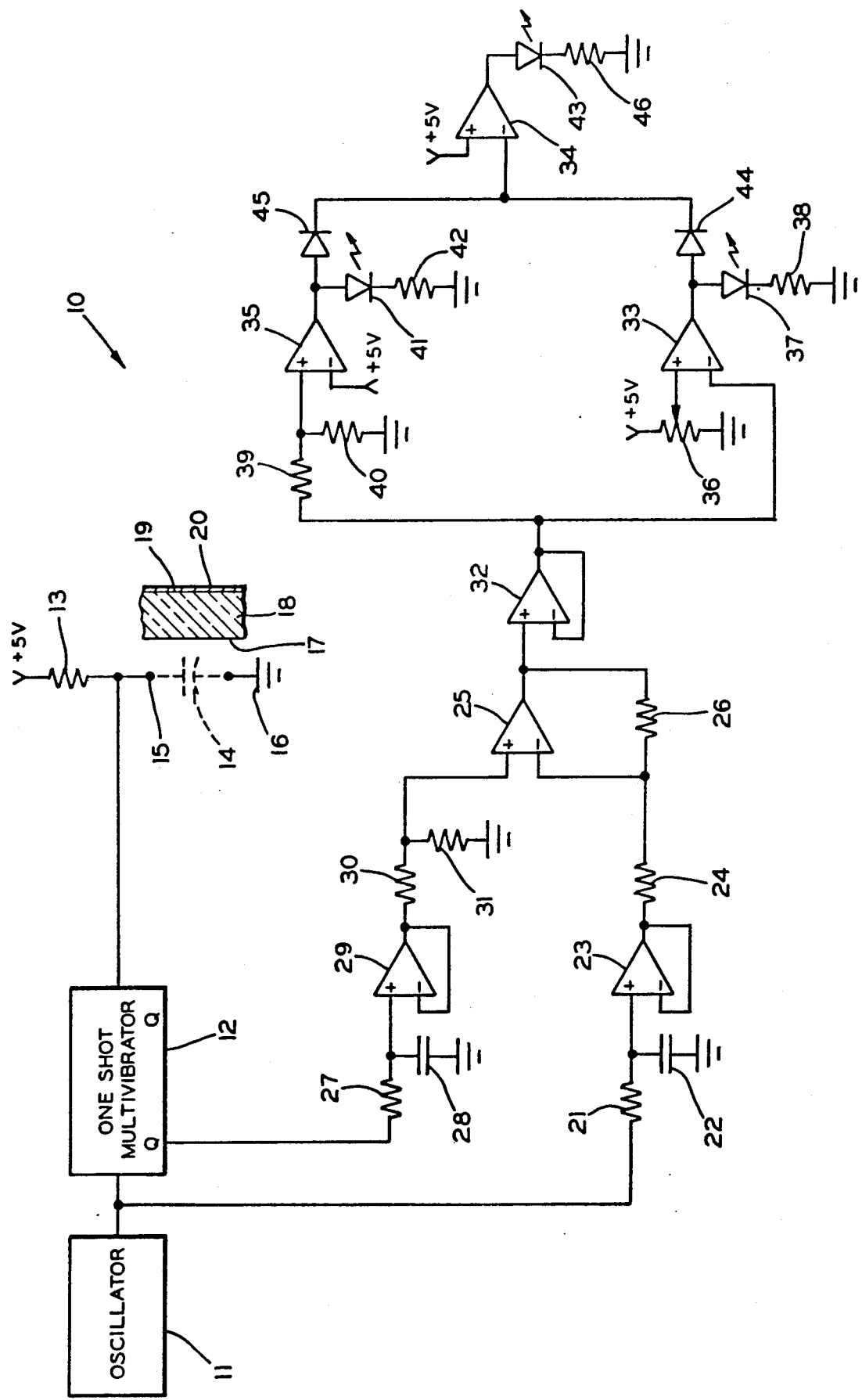

GLASS SURFACE COATING DETECTOR

TECHNICAL FIELD

This invention related to measuring and testing and more particularly to apparatus and a method for detecting the presence and location of a transparent electrically conducting solar reflective coating on a surface of a single glass pane or of an assembly of two or more glass panes.

BACKGROUND ART

For architectural applications, surface coatings are often used on glass to reduce thermal transfer through the glass. The coatings are effective for reflecting and/or absorbing certain wavelengths of solar radiation that strike it. The coatings are generally in the form of an electrically conductive transparent film on one surface of the glass. It is often difficult to visually detect the presence or absence of a solar surface coating on glass. Further, even when the presence of a solar coating is detected, it is almost impossible to visually detect which side of the glass sheet is coated. It may be desirable to have the coated surface on the interior of the building to protect the coating from the outside environment. The problem may become even more important where a window pane assembly is formed from two spaced sheets of glass. Preferably, a solar coating is placed on the interior surface, i.e., the surface between the two panes, of the outer glass pane. If the coating is located on the inner glass pane, there may be excessive heat buildup between the spaced window panes which could lead to premature failure of the seal between the panes.

DISCLOSURE OF INVENTION

According to the invention, apparatus is provided for rapidly detecting the presence of electrically conductive surface coatings on glass and for detecting which surface of the glass is coated. For dual pane glass assemblies, the detector may be operated to indicate the presence of a surface coating and if the coating is on the interior surface of the near or the far pane. The apparatus operates by incorporating the glass in a capacitor and detecting variations in the capacitance caused by the presence and location of or the absence of a conductive surface coating on the glass.

The apparatus of the invention includes a pulse source which triggers a one shot multivibrator. The pulse width from the multivibrator is determined by a resistor-capacitor timing circuit. The capacitor is a variable determined by the absence or presence of an electrical conductor adjacent a probe. When the probe is placed against a glass pane, the value of the capacitance will vary with the absence of or the presence of a conductive coating on the glass and, if a coating is present, with the distance of the coating from the probe. Thus, the pulse width from the multivibrator is modified by the presence of a surface coating and with the distance of the coating from the probe. The original oscillator pulses and the variable width multivibrator pulses are each integrated and compared to obtain a voltage which varies with the presence or absence of a conductive glass surface coating and, if present, with the distance from the probe of the surface containing the coating. This voltage is compared with references to selectively illuminate three indicators which indicate the presence or absence of a surface coating and, if present, if the coating is on the near or the far surface on the glass. When the apparatus is used with dual pane glass assemblies, it may be calibrated to indicate if the coating is on the interior surface of the near or the far pane.

Accordingly, it is an object of the invention to provide apparatus for detecting the presence of an electrically conductive surface coating on a glass pane and, when present, for indicating the surface which contains the coating.

Various objects and advantages of the invention will be apparent from the following detailed description and the accompanying drawing.

BRIEF DESCRIPTION OF THE DRAWING

The single FIGURE is a schematic diagram of a circuit for a glass surface coating detector according to the invention.

BEST MODE FOR CARRYING OUT THE INVENTION

Referring to the single drawing FIGURE, a circuit diagram is shown for apparatus 10 according to the invention for detecting and indicating the presence and surface location of an electrically conductive surface coating on a sheet of glass. The apparatus 10 includes an oscillator 11 which establishes a relative low frequency pulse train, for example, having a frequency on the order of 5 to 7 KHz. The output from the oscillator 11 is connected to trigger a one shot multivibrator 12. The multivibrator 12 establishes an output pulse in response to each trigger pulse. The width of each output pulse is determined by the values of a timing circuit formed by a resistor 13 and a capacitor 14.

The capacitor 14 is located between a probe 15 and a ground 16 for the circuit 10. According to the invention, the probe 14 is positioned against a surface 17 of a sheet of glass 18. The glass 18 may be uncoated, or it may have a surface coating on the near surface 17 or on a far surface 19. For the illustrated sheet of glass 18, an electrically conductive surface coating 20 is shown located on the far surface 19. The value of the capacitor 14 will vary with the presence or absence of a conductive surface coating 20 on the glass 18 and, if a coating 20 is present, with the location of the coating 20 on the far surface 19 or the near surface 17. Consequently, the pulse width or the duty cycle of the pulse output from the multivibrator 12 will vary depending on the absence of a surface coating 20 and with the location of a surface coating 20 on the surface 17 near the probe 15 or on the surface 19 further from the probe 15.

The circuit 10 is responsive to the different values of the capacitance 14 for selectively indicating the absence of or the presence and location of the electrically conductive surface coating 20. The capacitance level at the probe 15 is detected by comparing the integral of the variable duty cycle pulse train from the multivibrator 12 with the integral of the constant duty cycle pulse train from the oscillator 11. The pulse output from the oscillator 11 is applied through a passive integrator consisting of a resistor 21 and a capacitor 22 to the noninverting input to an operational amplifier 23. The output of the amplifier 23 is connected directly to the inverting input for the amplifier 23, thus forming a voltage following buffer amplifier. The output from the amplifier 23 also is applied through a resistor 24 to the inverting input to an operational amplifier 25 operated as a comparator. The comparator 25 includes a negative feedback resistor 26.

The variable duty cycle pulse output from the multivibrator 12 is applied through a passive integrator consisting of a resistor 27 and a capacitor 28 to the noninverting input to an operational amplifier 29. The output from the amplifier 29 is applied to the inverting input to the amplifier 29 to drive the amplifier 29 as a voltage following buffer amplifier. The output from the amplifier 29 also is applied through a resistor 30 to the noninverting input to the comparator 25. A resistor 31 is connected between the noninverting input and ground. The output from the comparator 25 is applied to a voltage following buffer amplifier 32. The amplifier 32 will have an output voltage which is proportional to the difference between the constant voltage applied from the buffer 23 to the comparator 25 and the variable voltage applied from the buffer 29 to the comparator 25. This difference will depend on the value of the capacitance 14 sensed by the probe 15.

The voltage at the output of the amplifier 32 is classified into three ranges by three comparators 33-35. The lowest voltage range detected by the comparator 33 is present when the glass 18 is clear of conductive coatings and, hence, the capacitance 14 has its lowest value. The comparator 34 is responsive to the middle voltage range when the coating 20 is on the glass surface 19 furthest from the probe 15 and the capacitor 14 has an intermediate value. The comparator 35 senses the highest voltage range when the coating 20 is on the glass surface 17 nearest the probe 15 and the capacitor 14 has a maximum value.

The output from the buffer 32 is applied to the inverting input to the comparator 33. A potentiometer 36 is connected between a positive voltage source (not shown) and ground. The voltage source may be, for example, 5 volts obtained from a 9 volt battery and a suitable voltage regulator. The potentiometer 36 has a tap terminal connected to apply a preselected voltage less than the source voltage to the noninverting input to the comparator 33. The comparator 33 has an output whenever the voltage from the buffer 32 is less than the voltage applied from the potentiometer 36. The output from the comparator 33 flows through an LED 37 and a current limiting resistor 38 to ground to illuminate the LED 37. Thus, the LED 37 is illuminated when there is no surface coating 20 near the probe 15 and, consequently, there is a minimum capacitance 14 between the probe 15 and ground.

The comparator 35 has an inverting input connected to the positive voltage source. The output from the buffer 32 is applied through a resistor 39 to the noninverting input to the comparator 35. The noninverting input also is connected through a resistor 40 to ground. When a portion of the output voltage from the buffer 32 determined by the values of the resistors 39 and 40 exceeds the voltage applied to the inverting input of the comparator 35, the comparator 35 will have a positive output. The output from the comparator 35 is applied through a series LED 41 and a current limiting resistor 42 to illuminate the LED 41 whenever the output voltage from the comparator 32 exceeds a predetermined value. The components of the circuit 10 are selected so that the LED 41 will be illuminated whenever a conductive coating 20 is located on the glass surface 17 nearest the probe 15.

The outputs of the comparators 33 and 35 are logically connected in a NOR logic arrangement to cause an LED 43 to be illuminated whenever both LED's 37 and 41 are off. The output of the comparator 33 is applied through a diode 43 to the inverting input to the comparator 34 and the output of the comparator 35 is connected through a diode 45 to the inverting input to the comparator 34. The noninverting input to the comparator 34 is connected to a positive voltage source. Whenever either comparator 33 or 35 has an output to illuminate one of the LED's 37 or 41, a voltage will be applied to the inverting input to the comparator 34 and the comparator 34 will have no output. When a conductive coating 20 is present on the glass surface 19 furthest from the probe 15, the capacitor 14 will have an intermediate value and the voltage at the output from the buffer 32 will be too high to cause illumination of the LED 37 and too low to cause illumination of the LED 41. Since no signal is applied to the inverting input to the comparator 34, the comparator 34 will establish an output which is applied through the LED 43 and a series current limiting resistor 46 to illuminate the LED 43.

The circuit 10 may be calibrated to detect coatings on the near and far surfaces of a single sheet of glass or to detect coatings on either the near sheet or the far sheet of a two pane glass assembly. The value of the capacitance 14 when a surface coating 20 is present on the near or far glass panes will vary with the thickness of the glass assembly. In the United States, residential glass typically is ⅛ inch thick and commercial glass is ¼ inch thick. Different calibration of the potentiometer 36 is required in order to distinguish between a coating on the far pane of a residential glass assembly and on the near pane of a commercial glass assembly. If desired, it will be apparent that two voltage dividers and a two position switch (not shown) may be used to replace the potentiometer 36. The switch will have one setting for "commercial" glass assemblies and a second setting for "residential" glass assemblies.

The circuit 10 has several advantages. It is suitable for mounting in a small hand held package for operation form a standard 9 volt battery. The probe 15, which is on one side of the package, is placed against a glass pane and a power button (not shown) is pushed to apply power to the circuit 10. Depending on the absence or presence and location of a conductive coating near the probe 15, one of the LED's 37, 41 or 43 will be illuminated. If desired, the LED's may be of different colors to facilitate reading the output from the surface coating detector. For example, the LED 37 may be green to indicate the absence of a surface coating 20, the LED 41 may be yellow to indicate a coating 20 on the near glass surface 17 and the LED 43 may be red to indicate a coating 20 on the far glass surface 19. Due to its balanced design, the circuit 10 is relative insensitive to temperature variations and to variations in the power supply voltage. For example, the oscillator 11 establishes the same frequency for the variable duty cycle input to the integrator formed by the resistor 27 and capacitor 28 and the constant duty cycle input to the integrator formed by the resistor 21 and capacitor 22. Thus, voltage variations will have similar effects on the two inputs to the comparator 25.

It will be apparent to those skilled in this art that various modifications and changes may be made in the above described preferred embodiment of the invention without departing from the spirit and the scope of the following claims.

We claim:

1. Apparatus for detecting the presence and surface location of an electrically conductive coating on a sheet of glass comprising capacitive probe means for positioning against a sheet of glass, said probe means having a first capacitance in the absence of a conductive coating on the glass, a second capacitance if a conductive coating is present on a far glass surface and a third capacitance if a conductive coating is present on a near glass surface, and means responsive to the capacitance at said probe means for selectively indicating the absence of a conductive coating on the glass, the presence of a conductive coating on the far glass surface and the presence of a conductive coating on the near glass surface.

2. Apparatus for detecting the presence and surface location of an electrically conductive coating on a sheet of glass, as set forth in claim 1, wherein said indicating means includes means for generating a train of pulses having a predetermined frequency and a variable duty cycle determined by the capacitance at said probe, and means responsive to the duty cycle of said pulse train for selectively indicating the presence and location of and the absence of an electrically conductive glass surface coating.

3. Apparatus for detecting the presence and surface location of an electrically conductive coating on a sheet of glass, as set forth in claim 2, wherein said means responsive to the duty cycle of said pulse train includes means for comparing the integral of said pulse train with the integral of a pulse train having said predetermined frequency and a constant duty cycle to establish a voltage having a first value within a first predetermined range in the absence of a conductive glass surface coating, a second value within a second predetermined range in the presence of a conductive surface coating on a predetermined far glass surface and a third value within a third predetermined range in the presence of a conductive surface coating on a predetermined near glass surface, and means responsive to the value range of such established voltage for selectively energizing one of first, second and third lights.

4. Apparatus for detecting the presence and surface location of an electrically conductive coating on a sheet of glass, as set forth in claim 3, wherein said lights are light emitting diodes.

5. Apparatus for detecting the presence and surface location of an electrically conductive coating on a sheet of glass, as set forth in claim 3, and including glass thickness calibrating means for establishing a voltage separating said first and second voltage ranges.

6. A method for detecting and indicating the presence and surface location of an electrically conductive coating on a sheet of glass comprising the steps of:
 a) forming a capacitor including at least one sheet of glass, said capacitor having a first capacitance in the absence of a conductive coating on the at least one sheet of glass, a second capacitance if a conductive coating is on a predetermined far surface of the at least one sheet of glass and a third capacitance if a conductive coating is on a predetermined near surface of the at least one sheet of glass;
 b) establishing a voltage in response to the value of said capacitor, said voltage falling within a first range in response to said first capacitance, within a second range in response to said second capacitance and within a third range in response to said third capacitance; and
 c) indicating the absence of and the presence and location of a conductive coating on a glass surface in response to the voltage range of said established voltage.

7. A method for detecting and indicating the presence and surface location of an electrically conductive coating on a sheet of glass, as set forth in claim 6, wherein the absence of and the presence and location of a conductive coating are indicated by energizing a first light source in response to the established voltage falling in said first range, energizing a second light source in response to the established voltage falling in said second range and energizing a third light source in response to the established voltage falling in said third range.

8. A method for detecting and indicating the presence and surface location of an electrically conductive coating on a sheet of glass, as set forth in claim 6, and including the step of establishing a predetermined voltage separating said first and second voltage ranges to calibrate for the spacing of the predetermined near and far glass surfaces.

* * * * *